Figure 9:
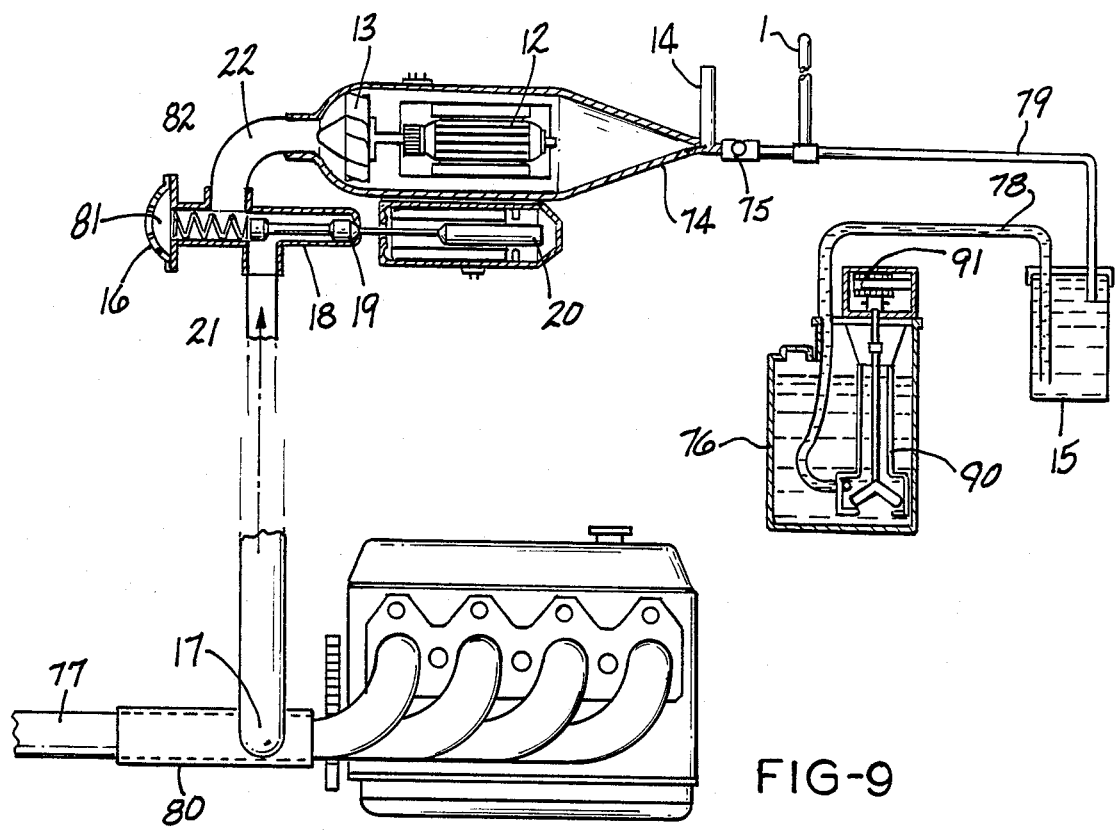

United States Patent [19]

Delluc

[11] Patent Number: 4,821,363
[45] Date of Patent: Apr. 18, 1989

[54] DEVICE FOR WASHING AND DEFROSTING AUTOMOBILE WINDSHIELDS

[76] Inventor: René Delluc, 74 bis Bld Gambetta, Nice, France

[21] Appl. No.: 97,158

[22] Filed: Sep. 15, 1987

[30] Foreign Application Priority Data

Sep. 29, 1986 [FR] France .............................. 86 13654

[51] Int. Cl.$^4$ .............................................. B60S 1/46
[52] U.S. Cl. ............................. 15/250.05; 15/250.04; 15/250.07; 15/250.09; 15/250.19; 15/250.41
[58] Field of Search .......... 15/250.01, 250.02, 250.04, 15/250.05, 250.06, 250.07, 250.09, 250.19, 250.20, 250.41

[56] References Cited

U.S. PATENT DOCUMENTS

| | | | |
|---|---|---|---|
| 1,610,361 | 12/1926 | Colvin | 15/250.19 |
| 2,582,717 | 1/1952 | Pierce | 15/250.04 |
| 3,427,675 | 2/1969 | Tibbet | 15/250.05 |
| 3,447,186 | 6/1969 | Senkewich | 15/250.04 |
| 4,192,038 | 3/1980 | Klein et al. | 15/250.05 |

FOREIGN PATENT DOCUMENTS

| | | | |
|---|---|---|---|
| 665375 | 9/1938 | Fed. Rep. of Germany | 15/250.19 |
| 1938618 | 2/1971 | Fed. Rep. of Germany | 15/250.2 |
| 0183250 | 9/1985 | Japan | 15/250.04 |
| 402189 | 11/1933 | United Kingdom | 15/250.07 |

*Primary Examiner*—Harvey C. Hornsby
*Assistant Examiner*—Christine A. Peterson
*Attorney, Agent, or Firm*—Bachman & LaPointe

[57] ABSTRACT

In order to achieve satisfactory defrosting without causing undue wear of the wiper blades equipped with double tongues of elastomer material, the invention provides for first freeing the tongues from the coating of ice by blowing hot air into the duct formed between said tongues, then raising the pivot shaft (24) of the blade holder, and therefore the tongues, by applying an axial thrust to said shaft by means of the piston (27) of a jack (86) while retaining parallelism between the tongues and the windshield. The connection, preventing rotation but allowing free axial sliding, between the shaft (24) and the driving connecting rod (29) makes it possible for the shaft to pivot both in the raised position, while passing a current of hot air over the ice from the windshield wiper which has been lifted off the windshield, and in the lowered position in which the tongues bear against the windshield.

10 Claims, 5 Drawing Sheets

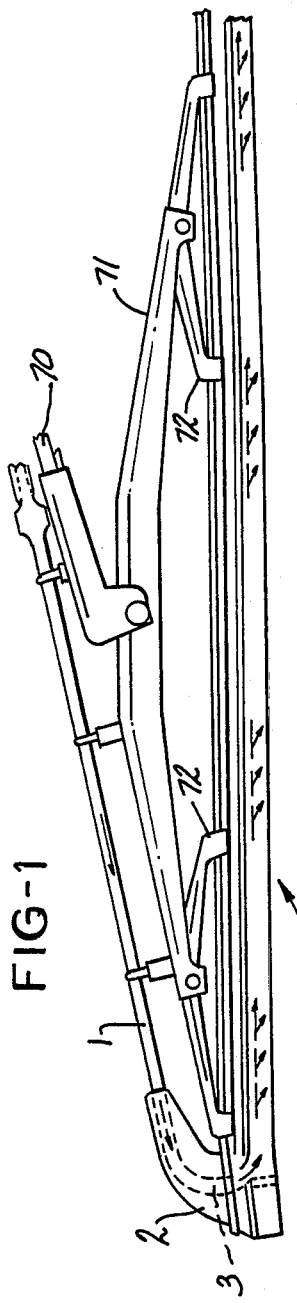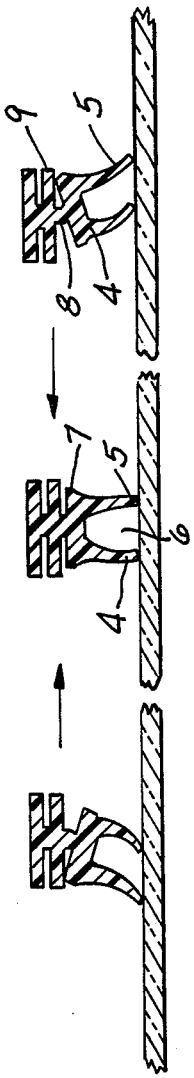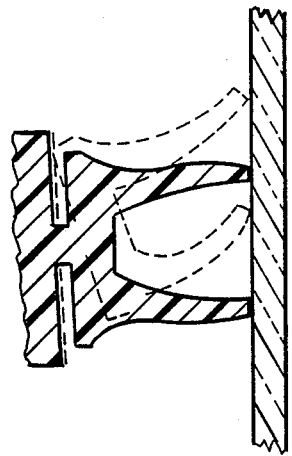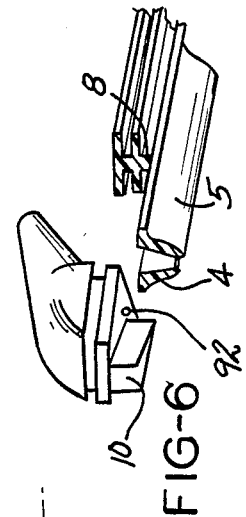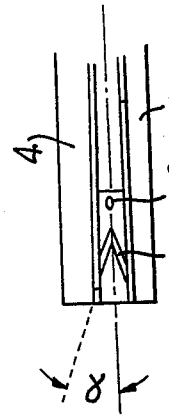

DEVICE FOR WASHING AND DEFROSTING AUTOMOBILE WINDSHIELDS

The present invention relates principally to a device for defrosting automobile windshields, of the type comprising:

at least one windshield wiper consisting of a blade holder and a blade, said blade holder being mounted at one end on a pivot shaft situated near the bottom part of the windshield and adapted to be given a reciprocating pivoting movement, and said blade being equipped with a scraper carrying a pair of tongues of an elastomer material, which tongues, together with their support, form the U-shaped walls of a duct open in the direction of the windshield, an air supply unit comprising a turbine drawing in air from at least one extraction point and blowing it into a tube which leads out between the pair of tongues near that end of said blade which sweeps through the longer arc, and means adapted to move said tongues away from the windshield.

The defrosting means marketed at the present time for use in vehicles are not satisfactory.

In order to remove the coating of ice which on very cold nights is deposited on the windshield of vehicles parked outdoors, the user must simply wait for the air heating the interior of the vehicle to become sufficiently warm to melt the ice by a heating action from the inside face of the windshield—which generally takes a very long time, or to apply direct action to the ice from outside the vehicle, under very uncomfortable conditions and often with rudimentary means.

Solutions have been proposed in attempts to improve this situation.

Thus, document U.S. Pat. No. 3,366,336 proposes taking hot air from zones around pipes discharging combustion gases from the engine, and supplying this air to diffusers disposed at the bottom of the windshield. However, because of the slope of almost all modern windshields and the tendency of hot air to rise in a cold atmosphere, most of this air escapes vertically and can melt only the ice situated in the zone immediately adjoining the diffusers.

The documents GB-A-No. 402.189 and U.S. Pat. No. 3,447,186 in turn propose delivering the hot air into rigid tubes constituting the arms supporting windshield wipers, and to arrange for this air to pass out via numerous apertures disposed over the length of the blades; it is true that this arrangement makes it possible to release blades which may have been stuck to the windshield by ice and to sweep the windshield with a current of hot air through the reciprocating movement of the wipers, but the disadvantage is that, as they do this, the elastomer blades rub against the ice crystals, so that their edges are very quickly worn; furthermore, the rigid tubes quite certainly prevent the elastomer blades from correctly wiping the windshield for lack of adaptation to the curvature of the latter.

Undue wear of the blades could be avoided by moving the blades away from the windshield before the reciprocating movement of the blade holder is started.

The lifting of the blades in this way is proposed by document JP-A-No. 060-185.668. This however relates to lifting by rocking about the pivot of the blade holder, which has the consequence of giving the blade an angular position, in relation to the windshield, such that the end of the blade remote from the pivot is at a very substantial distance from the windshield. This patent does not either describe or suggest that the lifting of the blades is effected as part of a defrosting operation with the injection of hot air. In any case, this lifting would be incapable of ensuring correct defrosting, because of the distance between the windscreen and the end of the blade remote from the pivot.

The present invention seeks to provide a new device which eliminates the disadvantages mentioned above.

This aim is achieved in that in the device according to the invention the means adopted for moving the blade tongues away from the windshield act by axial thrust on the pivot shaft of the blade holder, said shaft thus being displaceable between a lowered position in which the tongues rest on the windshield and a raised position in which they are moved away from the windshield while retaining their orientation substantially parallel to the windscreen.

Because of this arrangement the hot air injected into the duct formed by the tongues from the end of the blade which has the longer arc sweeps over the windshield while the windshield wiper is held away from the windshield but parallel to it and performs its reciprocating movement.

In a manner known per se the reciprocating pivoting movement is transmitted to the pivot shaft of the blade holder by means of a connecting rod connected to a drive shaft, and in one practical embodiment of the invention the opposite end of said connecting rod to that which is connected to the drive shaft forms a ring into which the pivot shaft is inserted, the internal periphery of the ring and the external periphery of said shaft each having at least one non-circular, complementary portion of its surface, thus preventing the rotation of the shaft in relation to the connecting rod, while allowing relative axial sliding.

These non-circular, complementary surfaces may for example be in the form of splines, flats, or other shapes.

The device according to the invention also preferably incorporates means improving the quality of the washing which can be achieved with the aid of the windshield wiper blade.

To this end, a washing liquid supply unit is provided in per se known manner, consisting of a liquid tank and a pump functionally connected to said tank and to a tube leading into the duct formed between the blade tongues of the windshield wiper.

The documents FR-A-No. 2.329.481 and JP-A-No. 60-183.250 described windshield wipers of this kind.

However, in the case of the French patent the washing liquid is injected into the duct from its bottom end, so that, unless the liquid is very highly pressurized, it cannot be suitably distributed as far as the other end of the duct. The quality of the washing in the top part of the windshield therefore cannot be satisfactory.

In the case of the Japanese patent, the injection is on the contrary effected through the top end of the duct, but no means are provided to ensure that the washing liquid will not escape through this top end, which is open, and spread out over the cleaned surface.

According to the invention, the washing liquid injection duct is the same as the one forming part of the air supply unit, so that it has a dual function.

In order to obviate the disadvantages of devices proposed in the prior art described above:

the end of the blade which sweeps through the longer arc is provided with a nozzle joined on the one hand to said tube and on the other hand to said duct, the tube communicates with the duct via a curved passage reversing the direction of travel of the washing liquid or the air, this passage leading out via an aperture in the bottom face of the nozzle, said bottom face is provided with a pair of strips arranged in the form of a V whose tip is situated in the immediate proximity of said aperture, facing said duct, and said strips are adapted to be engaged and secured sealingly between the tongues forming the duct.

As the result of these arrangements, on the one hand the washing liquid is forced to flow from the top end of the duct to the bottom of the latter, without any leakage from the top at the end of the blade which sweeps through the longer arc, and on the other hand the dual connection of the duct—washing liquid supply and air supply—enables it to serve four functions, namely: (1) washing the windshield, (2) expulsion of the washing liquid remaining after the washing by means of a blast of air, (3) demisting the windshield by a blast of warm air, and (4) freeing the scraper tongues when they are stuck fast by ice, and then de-icing the windshield by a blast of very hot air.

According to the invention two different air extraction points are provided in order to enable the air temperature to be selected in dependence on requirements. It will in fact be understood that it is desirable for very hot air to be delivered into the duct to free the tongues held fast by ice and to de-ice the windshield, but that in order to protect the elastomer material of said tongues it is nevertheless not advisable to subject them to high temperatures more often than is necessary. Air which is only tepid will be sufficient to demist the windshield or to expel residual washing liquid from the duct.

Consequently, according to the invention the turbine of the air supply unit is adapted to be connected:

to a "first" extraction point situated outside the immediate proximity of the engine of the vehicle, or to a "second" extraction point forming part of thermal treatment means situated near the pipe or pipes evacuating the combustion gases from the engine of the vehicle, which thermal treatment means communicate on the one hand with the ambient medium in the immediate proximity of the engine, and on the other hand with the turbine, or simultaneously to the first and second extraction points, in a determined ratio, the choice between these possibilities being made by means of a selector in the form of a slide valve distributor controlled by an electromagnet and bringing said turbine into communication with the first extraction point, or with the second, or with both in predetermined ratios.

The invention is of maximum interest when it incorporates means providing automatic succession of the operations giving optimum defrosting, washing or demisting.

To this end the device incorporates an electronic arrangement including a timing circuit and, when the user starts the defrosting of the windshield, controlling the energization of the electromagnet of the slide valve distributor to bring the turbine of the air supply unit at least mainly into communication with the second extraction point, the operation of said turbine, and, after a latency time regulated by said timing circuit, the operation of the jack lifting the blade holder and the starting of the motor effecting its reciprocating pivoting.

The electronic arrangement advantageously also includes a timing circuit which, when the user starts the washing of the windshield, controls on the one hand the operation of the pump of the washing liquid supply unit, with the consequent injection of said liquid into said duct via said tube, and on the other hand the starting of the motor effecting the reciprocating pivoting movement of the blade holder, and which, when the user interrupts the washing operation, then controls, in addition to the stopping of the pump, on the one hand the automatic operation, for a predetermined period of time, of the air supply unit turbine connected at least mainly to the first extraction point, with the consequent complete emptying of said tube, and on the other hand, after a latency time regulated by the timing circuit, the stopping of the motor effecting the reciprocating pivoting movement of said blade holder.

Finally, for demisting, the electronic arrangement controls the operation of the supply unit turbine connected at least mainly to the first extraction point, and the reciprocating pivoting of the blade holder.

Figures 11A, 11B:
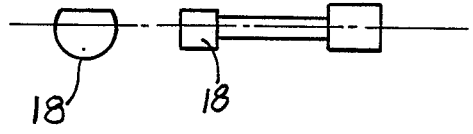
Figure 10:
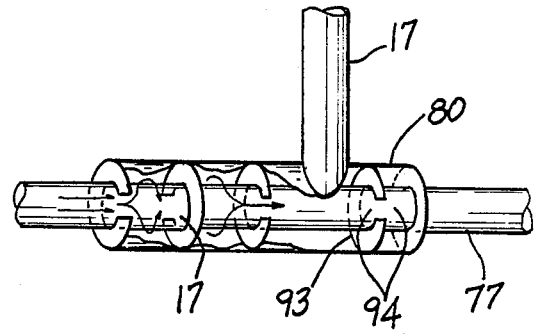
Figures 12, 13A, 13B:
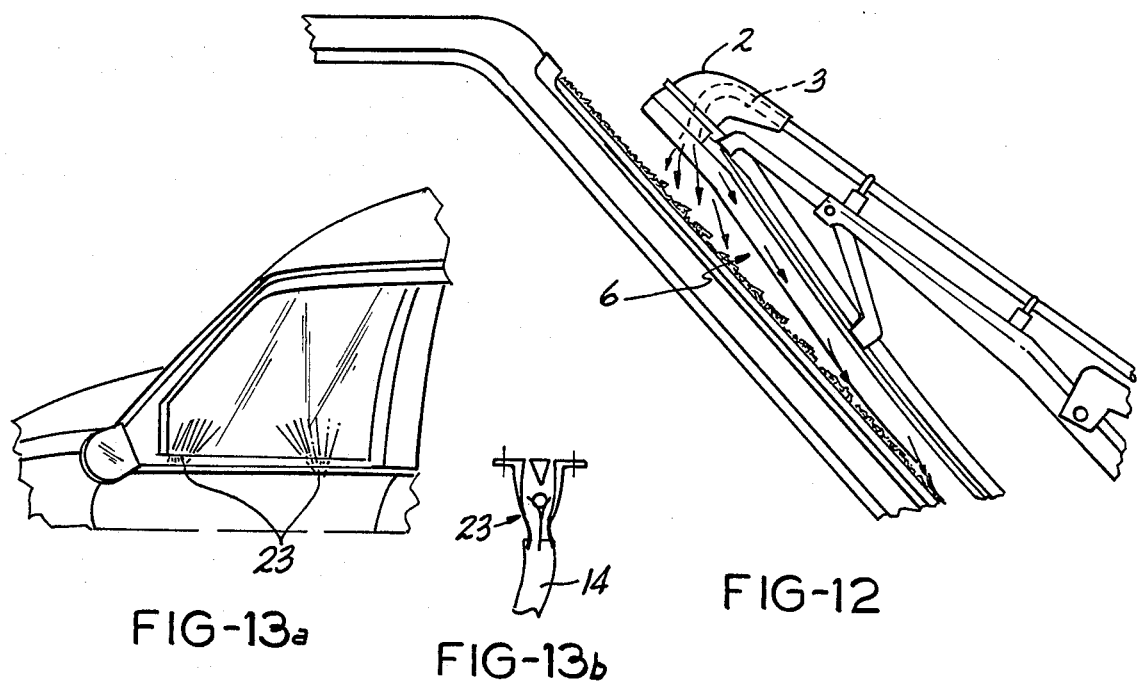
Figures 14, 15:
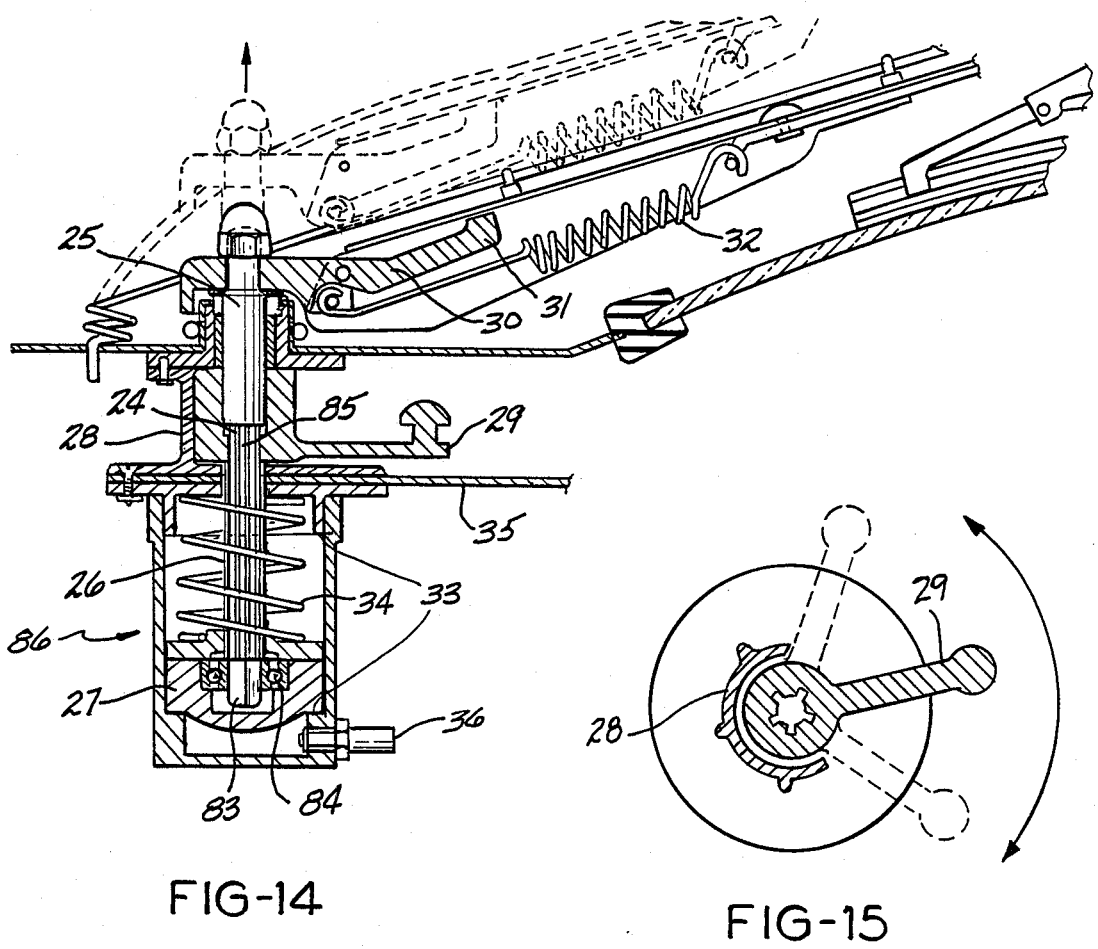
Figure 17:
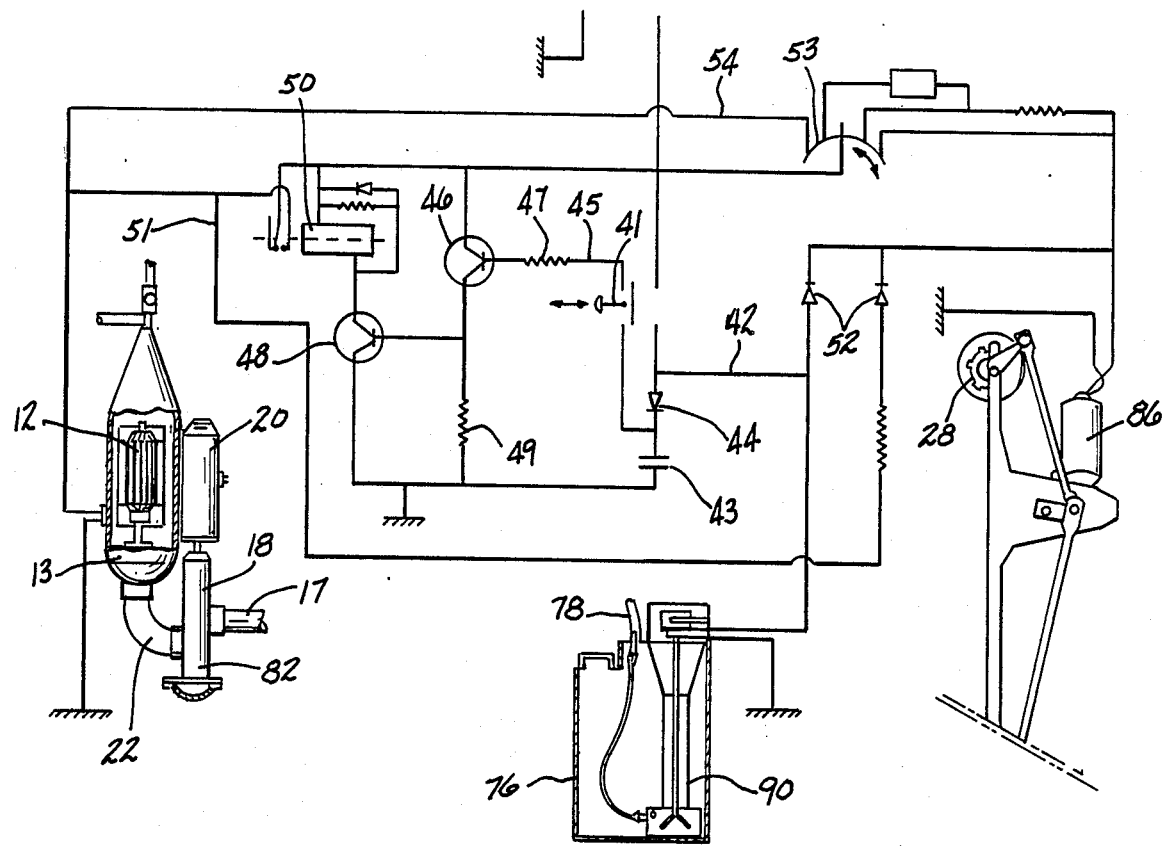
Figure 16:
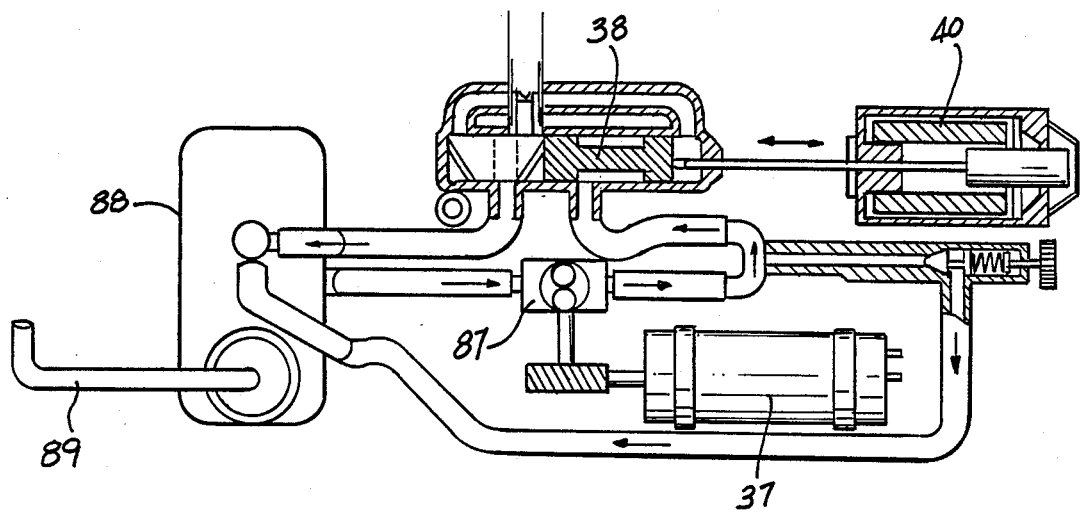
Figure 18:
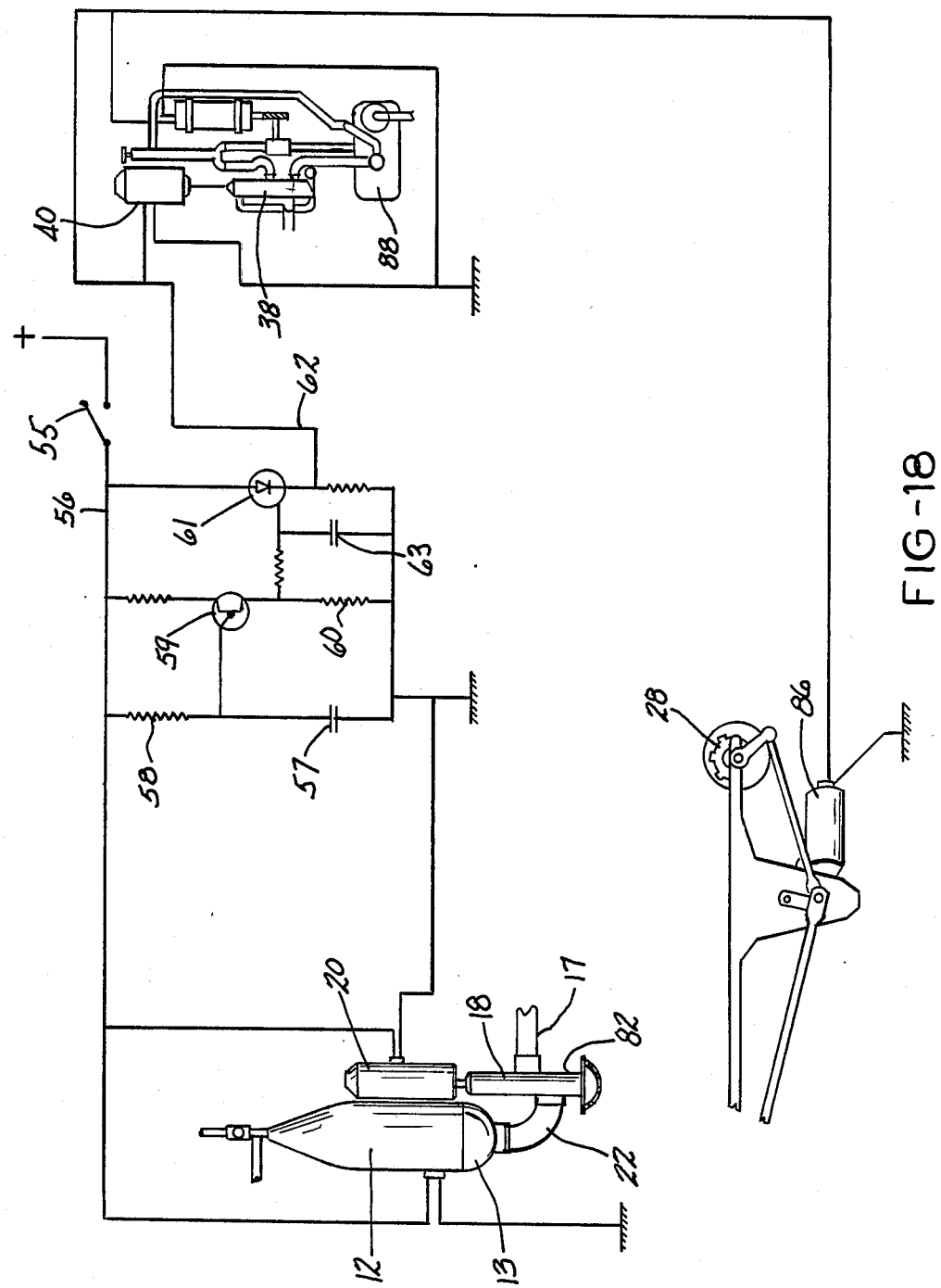

The invention will be better understood on perusal of the following description, which is given with reference to the accompanying drawings, in which:

FIG. 1 is a side view of a windshield wiper according to the invention, comprising a scraper blade mounted on the arm of a blade holder, FIGS. 2, 3 and 4 are cross-sections, on a larger scale, of the scraper blade shown in FIG. 1, respectively in the position of rest and during its reciprocating movements, FIG. 5 is a similar view, on a still larger scale, showing clearly the particular behaviour of the blade tongues, FIGS. 6 and 7 show respectively the means for connecting together the nozzle disposed on the end of blade holder which sweeps through the longer arc and the scraper blade, FIG. 8 is view from the underside of the nozzle and scraper blade connected together, FIG. 9 shows the washing liquid supply and air supply units, FIG. 10 is a detail view showing the connection to the second air extraction point (very hot air) and the means for the thermal treatment of that air, FIGS. 11a and 11b are respectively an end view and a side view of the piston of the slide valve device selecting the main air extraction point, FIG. 12 is a side view illustrating the blowing of very hot air onto the windshield, FIGS. 13a and 13b show respectively the blowing of very hot air onto the door windows of a vehicle by means of a suitable jet, and, in section on a larger scale, the jet in question, FIG. 14 shows in section the connection of the blade holder lifting jack, with details of the pivot shaft of the blade holder, FIG. 15 shows a detail of the connection means between the pivot shaft shown in FIG. 14 and a drive shaft coupled to the linkage of the motor operating the blade holder, FIG. 16 shows schematically the pump unit supplying pressure fluid to the blade holder lifting jack, FIG. 17 shows the electronic arrangement effecting the automatic delivery of air into the tube after each washing operation, and FIG. 18 shows the electronic arrangement regulating the defrosting operations.

FIG. 1 shows a windshield wiper comprising an arm 70, to which is fixed a blade holder 71 supporting, by means of bows 72, a blade 73 equipped with a two-tongued scraper.

The washing and defrosting device according to the invention comprises, as can be seen in FIG. 1, a flexible tube 1 coming from the engine compartment and fixed on the back of the blade holder 71 and on the bows 72. This tube 1 is adapted to supply washing liquid or air to a nozzle 2 situated at the end of the blade 73 which sweeps through the longer arc, in which nozzle a passage 3 is provided to extend the tube 1 and form a bend which reverses the direction in which the fluid circulates.

The elastomer scraper provided on the blade 73 has a special shape, as can be seen in FIGS. 2 to 5.

Viewed in section, this scraper has a profile comprising two tongues 4 and 5 leaving between them a space forming a duct 6, which is U-shaped with its opening directed towards the windshield.

At the top the two tongues 4 and 5 are integral with a rocking plate 7, which is common to them and which oscillates about a pivot 8, which is likewise common to the two tongues.

This construction brings the entire section of the duct 6 as close as possible to the glass surface, thus forcing the washing liquid into continuous contact with the windshield, while the pivot 8 gives the tongues 4 and 5 the inclination necessary for the latter to effect under good conditions the wiping-away of the liquid and the scraping-away of dirt.

When the washing liquid passes out of the passage 3 formed in the nozzle 2 to enter the duct 6, it is important that it should not be able to rise in this duct and escape from the top of the blade 73, from which it would spread out over the entire surface of the windshield, including the part just cleaned.

To achieve this, as can be seen in FIGS. 1, 6, 7 and 8, the nozzle 2 is provided on its inner face with two strips 10 disposed obliquely and joined together at the end situated near the aperture 92 of the passage 3.

These two strips 10 take up position between the tongues 4 and 5, to which they are sealingly connected to form a partition in the top part of the duct, as can be seen in FIGS. 6 and 7.

The length of these strips 10 is selected so that each of them will be oriented at a small opening angle $\alpha$ to the center line of the scraper (FIG. 8), so that during the movements of the blade the flexion of these strips 10 will have maximum effect in their lateral direction.

The device according to the invention incorporates an air supply or blower unit intended principally for supplying hot air for defrosting and demisting, but also proving useful for improving washing operations.

In this process, in fact, it is preferable during cold seasons for residual washing liquid not to be left in external tubing, particularly if an antifreeze has not been added to it.

The automatic intervention of the blower unit, controlled by an electronic circuit for brief operation after each wash, provides a solution to this problem by driving off this residual liquid on each occasion.

This blower unit, which is illustrated in FIG. 9, comprises a two-speed electric motor 12 driving a turbine 13, which may be of the centrifugal compression type or of the axial blast type. This turbine directs the air to a nozzle 74, which slightly compresses this air before delivering it to the tube 1 and consequently to the duct 6.

FIG. 9 also shows the washing liquid supply system for the windshield wiper. This supply system comprises a liquid tank 76 equipped with a conventional pump 90 and a siphon 15 in communication with one another by way of a tube 78. The siphon 15 is connected to the tube 1 by a tube 79.

A nonreturn valve 75 is disposed between the tube 1 and the nozzle 74 to prevent liquid from penetrating into the zone of the turbine 13.

A pipe 14, connected upstream of the nonreturn valve 75, may optionally be provided to take off a part of the air coming from the blower unit and deliver it to door jets 23 situated at the bottom of the windows, as will be explained later on (FIGS. 13a and 13b).

The blower is supplied with air by an air intake 81 provided with a filter 16 and constituting the first extraction point, outside the immediate proximity of the engine.

For the purpose of defrosting, for which a blast of hot or very hot air is required, this air is taken from a point near the pipe or pipes or manifold 77 expelling combustion gases from the engine; these gases, whose temperature is close to 2000° C., rapidly heat this manifold. The air is extracted at a pipe 17 ending in a muff 80 (FIGS. 9 and 10) surrounding the manifold and equipped with internal partitions 93 provided with apertures 94 disposed to form baffles forcing the inspired air to circulate in an enveloping movement around the hot manifold 77 and to remain in prolonged contact with said manifold, thus permitting intensive heating of the air despite its relatively very short residence time in the muff. The muff 80 constitutes the second extraction point.

The choice of the air extraction point is made automatically with the aid of a slide valve 18 (FIGS. 9 and 11), which moves inside a cylinder 19 opening onto three pipes, namely (1) a pipe 22 which leads to the blower unit, (2) a pipe 82 which leads to the outside by way of the air intake 81 equipped with the filter 16, and (3) the pipe 17 leading to the heating muff 80.

The slide valve 18 is controlled by an electromagnet 20 and a spring 21. In the position of rest this slide valve brings the pipe 22 into communication mainly with the pipe 82, while when it is pushed by the electromagnet 20 it brings the pipe 22 mainly into communication with the pipe 17.

As can be seen in FIG. 11, at the end where the three pipes 82, 22, and 17 are situated the piston of this slide valve 18 has in cross-section the shape of a part of a disk, so that partial communication subsists between the pipes selected by the slide valve. .This has for example the consequence that in the position of rest the air drawn in through the filter 16 is mixed with, and therefore heated by, a small amount of very hot air coming from the pipe 17 and passing through this partial communication passage. Air slightly heated in this way will be used to drive out residual washing liquid and to demist the windshield quickly.

For the defrosting operation, the reverse occurs and the greater part of the air extracted is very hot air. When the operator starts the defrosting operation the electromagnet 20 controlled by an electronic circuit is in fact energized simultaneously with the blower motor, which is then set to its highest speed of rotation so that this very hot air will be blown under a certain pressure.

FIG. 12, which shows the top part of a windshield wiper according to the invention during a defrosting operation, that is to say in the raised position—as will be explained later on—and blowing the hot air, shows that this air acts simultaneously through its physical action of heating the ice and through its mechanical action in pushing the melting drops onto zones still covered with ice. The orientation of the jet and the construction of the scraper force a part of this air to follow the duct 6 in order to extend its action to a zone distant from the top of the brush.

FIGS. 13a and 13b show how the door windows can be defrosted and demisted, by incorporating jets 23 in the doors and feeding them with hot air by way of the tube 14. The arrangement of these windows in a plane close to the vertical enables the rising hot air to make extensive contact with the windows and the ice covering them.

As has already been stated, the device according to the invention also makes it possible to achieve accelerated demisting of the windshield without admitting hot air into the passenger compartment of the vehicle.

In order to remove the mist, the usual process consists in blowing hot air onto the inner face of the windshield, but since this air is heated by the heating circuit, which itself gives a rise in temperature only after the engine has been running for a long time, this demisting is completed only after a fairly long time.

The present device makes it possible to accelerate this result by blowing onto the outer face of the windshield hot air which, as has been seen above, is partly taken from the region of the exhaust manifold and is therefore heated more quickly than the air in the heating system. In addition, this air cannot inconvenience passengers through disagreeable odors.

In the circuit arrangement shown in FIG. 17, which will be described in detail later on, a contact 53 and an additional line 54 bring the blower into action at the same time as the blades are moved, in order to accelerate the demisting or to combine it with the wiping away of rainwater.

One of the most important functions of the device according to the invention is to permit automatic defrosting of the windshield.

This function is served by the blower unit already described, a mechanism which raises the wiper blades in a plane parallel to the windshield after the blade tongues have been detached from the coating of ice holding them fast, and an electronic circuit arrangement controlling the operations automatically.

As can be seen in FIG. 14, the pivot shaft 24 of each blade holder is for this purpose fastened to the piston 27 of a jack 86 acted on by the thrust of a fluid delivered by a pumping unit. More precisely, the pivot shaft 24 is composed of a top part 25 having a smooth periphery and a bottom part 26 having a splined surface and ending in another cylindrical part 83, which is inserted into a ball bearing 84 fastened to the piston 27. The splined part 26 of the shaft 24 is adapted to slide in a ring whose internal periphery is correspondingly splined and which forms the head of a connecting rod 29. This ring is in turn movable inside a sleeve 28 which, as can be seen in FIG. 15, has a semicircular cutout allowing the connecting rod 29 to make its angular reciprocating movement to drive the blade holder.

Exactly as in systems at present in use, the shaft 24 carries at its top end a hub 30 to which the blade holder is fixed, as well as a tension spring 32 which applies the blade against the windshield. This hub 30, without having any special shape, is larger than those normally used in order to ensure that the blades are correctly lifted.

The shaft 24 fastened to the piston 27 is adapted to move vertically over a length determined by the distance between top and bottom stops 33 limiting the movement of the piston.

A spring 34 applies pressure to the piston 27, even when the latter is in the bottom position, thus applying permanent tension to the pivot shaft 24 and so ensuring firm application of the blade against the windshield for the wiping and washing operations.

The body of the jack 86 is fixed on the sleeve 28 and on the end of a plate 35 which maintains the spacing of the linkage of the blade drive mechanism.

Said jack 86 receives via a pipe 36 the pressure liquid supplied by a pumping system.

It is in fact preferable to use a hydraulic system to supply pressure to the jack 86. Apart from the ease of adjustment of the pressure, this process enables the pumping unit to be installed some distance from the jack 86 and thus to be easily accommodated in the engine compartment.

The hydraulic unit illustrated in FIG. 16 is of a known type. It comprises an electric motor 37 driving a pump 87, which may be of the gear type or of the positive displacement vane type or of some other type, in view of the fact that the pressure which it has to supply is low.

This pump 87 draws in the liquid contained in a tank 88 and delivers it into a slide valve distributor 38, which is controlled by an electromagnet 40 operated simultaneously with the motor 37. If the pressure liquid used is oil whose viscosity increases with lower temperatures, the tank 88 is connected to the blower unit by a line 89 which applies hot air to said oil before and during its use.

As will be explained later on, this pumping unit is controlled by an electronic circuit arrangement, with timing of its energization.

As has already been stated, the washing and defrosting operation cycles are controlled by electronic circuits.

Two principal circuits control the operations:

As usual, washing is effected by delivering a current of washing liquid supplied by the pump 99, this operation being controlled by the driver. As soon as this operation is terminated the pump stops and the blower unit is automatically operated for a relatively short time to deliver air which drives out the residual liquid contained in the tube 1 and the duct 6. After a predetermined time the blower in turn stops and the reciprocating movement of the blades also stops.

In order to obtain this result, use is made of an electronic circuit arrangement of the kind shown in FIG. 17. This arrangement comprises a push-button contactor 41, which when depressed brings the current source (positive in the present instance) into communication with the direct circuit 42, which then simultaneously feeds the motor 91 operating the water pump 90 and the motor driving the blades. The same command brings about the charging of the capacitor 43 through the diode 44.

When the contactor 41 is released and returns to the position of rest, it brings the capacitor 43 into communication with a secondary circuit 45 feeding the base of a transistor 46 via a resistor 47.

This transistor 46, connected by its collector to the supply circuit, then becomes conductive and will remain so for a time dependent on the ratio of the values of the capacitor 43 and the resistor 47, this ratio determining the discharge time of the capacitor.

The transistor 46 is coupled to another transistor 48 by means of a so-called Darlington circuit, so that the amplified current delivered to the emitter of the transistor 46, but limited by a resistor 49, will feed the base of the transistor 48, which in turn will become conductive. The collector of this transistor 48 is connected to the supply circuit by means of the winding of a relay 50, which then closes its normally open contact, thus switching on the blower unit motor and which, by way of a shunt circuit 51, continues to feed the blade drive motor.

The relay 50 is equipped with a diode preventing inductive feedback, and the circuit is completed by stabilizer resistors, such as the resistor 49 already mentioned, which prevent the residual leakage current of the transistor 46 from amplifying that of the transistor 48, and also by diodes 52 preventing the blower unit and the water pump from being operated at the same time.

The entire operation of washing followed by blowing stops when the capacitor 43 is discharged.

As has already been stated, the contactor 53, added to the speed selector controlling the movement of the blades, and an additional electric line 54 make it possible to operate the blower and the blade motor simultaneously in order to effect accelerated demisting of the windshield.

The defrosting operation is controlled by the electronic circuit arrangement shown in FIG. 18.

As explained above, this operation must take place in three stages. It is first necessary to release the elastomer blade tongues from the ice adhering to them before the blades are raised, in order to prevent said tongues from being torn off; the blades must then be lifted in order to place the tongues above the layer of ice, and finally the blades must be moved to distribute the blast of hot air over the entire surface which is to be defrosted, it being understood that they are thus set in motion immediately after they have been lifted.

For this purpose the electronic circuit arrangement includes a contactor 55 allowing the feeding of the direct circuit 56, which immediately brings the blower into action, the blower motor being set at its highest speed of rotation, and which causes the electromagnet 20 to act on the slide valve 18 to allow air to be drawn in principally into the muff 80 surrounding the exhaust manifold of the engine. This hot air will melt the ice which is in contact with the blade tongues.

The circuit 55 feeds at the same time a timing circuit incorporating a capacitor 57, which is charged through a resistor 58. When the charge voltage of this capacitor 57 reaches the threshold voltage of a uni-junction transistor 59, said capacitor discharges abruptly into the input of said transistor 59, which then becomes conductive for a brief moment between its bases.

This brief conduction, converted into voltage by a resistor 60, delivers a pulse to the gate of a thyristor 61, which in turn becomes conductive.

This thyristor 61 then feeds a circuit 62, which by means of the pumping unit controls the delivery of pressure fluid into the jacks, which raise the blade holders. The blade holder drive motor also receives current through this same circuit.

The circuit arrangement is completed by protective resistors and optionally by a capacitor 63 preventing the inopportune triggering of the thyristor.

The delay in the raising of the blades and in setting them in motion is determined by the duration of the charging of the capacitor 57 through the resistor 58 and depends on the values given to these components, which values are selected in accordance with the time required for freeing the blade tongues from the coating of ice surrounding them; this time may be estimated at between 30 and 60 seconds depending on the region.

However, the value given to the resistor must always be fixed at an ohmic value higher than that which would be calculated to obtain the same delay at a normal temperature of about 20° C., in order to take into account the loss of a part of this ohmic value in cold weather.

The entire device according to the invention can be produced industrially at a cost price compatible with its incorporation in the equipment of medium-priced automobiles.

The mechanical components can in fact easily be made of moulded plastics material (including the casings of electrical components), and the electrical components are low power elements of entirely ordinary types. The entire production requires no special technique or accuracy.

It is clearly understood that the invention is not limited to the embodiment described and illustrated. In particular, although the invention has been described with reference to windshield wipers mounted pivotally near the bottom of the windshield, it could equally well be applied to windshield wipers mounted pivotally near the top of the windshield, as may be the case in certain motor buses or trucks. In this case the aperture 92 would be situated near the end of the blade which makes the shorter stroke, and the modifications accordingly required are within the scope of those skilled in the art.

I claim:

1. A device for defrosting automobile vehicle windshields, comprising:

defrosting control means, at least one windshield wiper consisting of a blade holder (71) and a blade (73), said blade holder (71) being mounted at one end on a shaft (24) adapted to be given, by a motor, reciprocating pivoting movement, and said blade (73) being equipped with a scraper carrying a pair of tongues (4, 5) of an elastomer material, which tongues, together with their support (7), form the U-shaped walls of a duct (6) open in the direction of the windshield, an air supply unit comprising a turbine (13) drawing in air from at least one extraction point, and a tube (1) which leads out between the pair of tongues (4, 5) near that end of said blade (73) which sweeps through the longer arc, mechanical raising means (27) adapted to move said tongues away from said windshield by axial thrust on the pivot shaft (24) of said blade holder (71), said shaft (24) thus being displaceable between a lowered position in which said tongues (4, 5) rest on a windshield, and a raised position in which said tongues (4, 5) are moved away from the windshield while retaining their orientation substantially parallel to said windshield, and actuating means, under control of said defrosting control means, and causing automatically, upon switching said defrosting control means on, the bringing of the turbine (13) of the air supply unit into communication with said at least one extraction point (17), the operation of said turbine (13), the operation of the raising means moving said tongues away from said windshield and the starting of the motor effecting the reciprocating pivoting movement of the blade holder, said tongues being maintained in their raised position by said axial thrust as long as said defrosting control means are not switched off.

2. A device as claimed in claim 1 in which the reciprocating pivoting movement is transmitted to the pivot shaft (24) by means of a connecting rod (29) connected to a drive shaft, wherein the opposite end of said connecting rod (29) to that which is connected to the drive shaft forms a ring into which the pivot shaft (24) is inserted, the internal periphery of the ring and the external periphery of said shaft each having at least one non-circular complementary portion (26, 85) of its surface, thus preventing the rotation of the shaft (24) in relation to the connecting rod (29), while allowing relative axial sliding.

3. A device as claimed in claim 1 in which the reciprocating pivoting movement is transmitted to the pivot shaft (24) by means of a connecting rod (29) connected to a drive shaft, wherein the opposite end of said connecting rod (29) to that which is connected to the drive shaft forms a ring into which the pivot shaft (24) is inserted, the internal periphery of the ring and the external periphery of said shaft each having at least one non-circular complementary portion (26, 85) of its surface, thus preventing the rotation of the shaft (24) in relation to the connecting rod (29), while allowing relative axial sliding, and wherein the opposite end of the pivot shaft (24) to that carrying the blade holder (71) connected to tongue raising means comprising a bearing (84) in which said blade holder is mounted, said bearing being made fast to a piston (27) forming part of a jack (86) co-axial to said shaft (24).

4. A device as claimed in claim 1, adapted for washing windshields of automobile vehicles and incorporating a washing liquid supply unit consisting of a liquid tank (76) and a pump (90) functionally connected to said tank (76) and to said tube (1), wherein:
   the end of said blade (73) making the longer stroke is provided with a nozzle (2) sealingly joined on the one hand to said tube (1) and on the other hand to said duct (6),
   the tube (1) communicates with the duct (6) via a curved passage (3) reversing the direction of travel of the washing liquid or the air, said passage (3) leading out via an aperture (92) in the bottom of the nozzle,
   said bottom face is provided with a pair of flexible strips (10) disposed in the form of a V whose tip is situated in the immediate proximity of said aperture (92), facing said duct (6), and
   said strips (10) are adapted to be engaged and secured sealingly between the tongues (4, 5) forming the duct (6) and adapted to bend laterally in the same direction as the tongues (4, 5).

5. A device as claimed in claim 1, wherein the tongues (4, 5) of said pair of tongues adjoin at the top, all along their width, a rocking plate (7) which is common to them, and wherein said tongues oscillate about a bridge of material which is likewise common to them and which forms a flexion pivot (8).

6. A device for defrosting automobile vehicle windshields, comprising:
   at least one windshield wiper consisting of a blade holder (71) and a blade (73), said blade holder (71) being mounted a one end on a shaft (24) adapted to be given a reciprocating pivoting movement, and said blade (73) being equipped with a scraper carrying a pair of tongues (4, 5) of an elastomer material, which tongues, together with their support (7), form the U-shaped walls of a duct (6) open in the direction of the windshield,
   an air supply unit comprising a turbine (13) drawing in air from at least one extraction point, and a tube (1) which leads out between the pair of tongues (4, 5) near that end of said blade (73) which sweeps through the longer arc,
   means (27) adapted to move said tongues away from said windshield by axial thrust on the pivot shaft (24) of said blade holder (71), said shaft (24) thus being displaceable between a lowered position in which said tongues (4, 5) rest on the windshield, and a raised position in which said tongues (4, 5) are moved away from the windshield while retaining their orientation substantially parallel to said windshield,
   wherein the turbine (13) is adapted to be connected:
   to a "first" extraction point (81) situated outside the immediate proximity of the engine of the vehicle,
   or to a "second" extraction point (17) forming part of thermal treatment means (80) situated near the pipe or pipes evacuating the combustion gases from the engine of the vehicle, which thermal treatment means communicate on the one hand with the ambient medium in the immediate proximity of the engine and on the other hand with the turbine, and
   or simultaneously to the first and second extraction points, in a determined ratio, the choice between these possibilities being made by means of a selector in the form of a slide valve distributor (18) controlled by an electromagnet (20) and bringing said turbine (13) into communication with the first extraction point (81), or the second extraction point (17), or with both in predetermined ratios, and wherein said thermal treatment means consist of a muff (80) surrounding the pipe or pipes evacuating the combustion gases from the engine of the vehicle, which muff encloses flow retarding means (93, 94) which reduce the speed at which the air passes through the muff, through which it is extracted by the turbine, and thus lengthen the duration of the heat exchange.

7. A device for defrosting automobile vehicle windshields, comprising:
   at least one windshield wiper consisting of a blade holder (71) and a blade (73), said blade holder (71) being mounted at one end on a shaft (24) adapted to be given a reciprocating pivoting movement, and said blade (73) being equipped with a scraper carrying a pair of tongues (4, 5) of an elastomer material, which tongues, together with their support (7), form the U-shaped walls of a duct (6) open in the direction of the windshield,
   an air supply unit comprising a turbine (13) drawing in air from at least one extraction point, and a tube (I) which leads out between the pair of tongues (4, 5) near that end of said blade (73) which sweeps through the longer arc, means (27) adapted to move said tongues away from said windshield by axial thrust on the pivot shaft (24) of said blade holder (71), said shaft (24) thus being displaceable between a lowered position in which said tongues (4, 5) rest on the windshield, and a raised position in which said tongues (4, 5) are moved away from the windshield while retaining their orientation substantially parallel to said windshield, wherein the turbine (13) is adapted to be connected:
to a "first" extraction point (81) situated outside the immediate proximity of the engine of the vehicle,
or to a "second" extraction point (17) forming part of thermal treatment means (80) situated near the pipe or pipes evacuating the combustion gases from the engine of the vehicle, which thermal treatment means communicate on the one hand with the ambient medium in the immediate proximity of the engine and on the other hand with the turbine, and
or simultaneously to the first and second extraction points, in a determined ratio, the choice between these possibilities being made by means of a selector in the form of a slide valve distributor (18) controlled by an electromagnet (20) and bringing said turbine (13) into communication with the first extraction point (81), or the second extraction point (17), or with both in predetermined ratios.

8. A device as claimed in claim 7 which incorporates an electronic arrangement comprising a timing circuit (57-62) and, when the user starts the defrosting of the windshield, controlling the energization of the electromagnet of the slide valve distributor to bring the turbine (13) of the air supply unit at least mainly into communication with the second extraction point (17), the operation of said turbine (13), and, after a latency time regulated by said timing circuit (57-62), the operation of the jack raising the blade holder (71) and the starting of the motor effecting its reciprocating pivoting.

9. A device according to claim 7, which incorporates an electronic arrangement including a timing circuit (41-51) and, when the user starts the washing of the windshield, controlling on the one hand the operation of the pump (90) of the washing liquid supply unit, with the consequent injection of said liquid into said duct (6) via said tube (1), and on the other hand the starting of the motor effecting the reciprocating pivoting movement of the brush holder (71), and, when the user interrupts the washing operation, then controlling, in addition to the stopping of the pump (90), on the one hand the automatic operation for a predetermined period of time of the air supply unit turbine (13) connected at least mainly to the first extraction point (81), with the consequent complete emptying of said tube (1), and on the other hand, after a latency time regulated by the timing circuit (41-51), the stopping of the motor effecting the reciprocating pivoting movement of said blade holder (71).

10. A device for defrosting automobile vehicle windshields, comprising:
at least one windshield wiper consisting of a blade-holder (71) and a blade (73), said blade holder (71) being mounted at one end on a shaft (24) adapted to be given a reciprocating pivoting movement, and said blade (73) being equipped with a scraper carrying a pair of tongues (4, 5) of an elastomer material, which tongues, together with their support (7), form the U-shaped walls of a duct (6) open in the direction of the windshield,
an air supply unit comprising a turbine (13) drawings in air from at least one extraction point, and a tube (1) which leads out between the pair of tongues (4, 5) near that end of said blade (73) which sweeps through the longer arc,
means (27) adapted to move said tongues away from said windshield by axial thrust on the pivot shaft (24) of said blade holder (71), said shaft (24) thus being displaceable between a lowered position in which said tongues (4, 5) rest on the windshield, and a raised position in which said tongues (4, 5) are moved away from the windshield while retaining their orientation substantially parallel to said windshield, and
an electronic arrangement which, when the user starts the demisting of the windshield, controls the operation of the supply unit turbine (13) connected at least mainly to the first extraction point (81), and the reciprocating pivoting movement of the blade holder (71).

* * * * *